United States Patent
Bursal et al.

[11] Patent Number: 5,989,145
[45] Date of Patent: Nov. 23, 1999

[54] IN-LINE SPEED CONVERTER WITH LOW PARTS COUNTS

[75] Inventors: Faruk H. Bursal, Waltham, Mass.; Michael P. Cunningham, Londonderry, N.H.; Frank A. Folino, Salem; Baosheng Chen, Chelmsford, both of Mass.

[73] Assignee: Synkinetics, Inc., Lowell, Mass.

[21] Appl. No.: 09/069,020

[22] Filed: Apr. 27, 1998

Related U.S. Application Data

[63] Continuation-in-part of application No. 09/016,501, Jan. 30, 1998, and application No. 09/054,088, Apr. 2, 1998.

[51] Int. Cl.⁶ ........................................................... F16H 1/34
[52] U.S. Cl. ................................................. 475/196; 475/185
[58] Field of Search ......................... 476/38, 36; 475/185, 475/196

[56] References Cited

U.S. PATENT DOCUMENTS

| | | | |
|---|---|---|---|
| 1,689,285 | 10/1928 | Knab | 74/650 |
| 1,946,358 | 2/1934 | Porsche et al. | 74/650 |
| 2,440,975 | 5/1948 | Robbins | 74/650 |
| 2,700,310 | 1/1955 | Viebrock et al. | 74/650 |
| 3,468,175 | 9/1969 | Rabek | 74/63 |
| 4,476,735 | 10/1984 | Cantwell | 74/84 R |
| 5,312,306 | 5/1994 | Folino | 475/196 |
| 5,321,988 | 6/1994 | Folino | 74/25 |
| 5,514,045 | 5/1996 | Folino | 476/36 |
| 5,562,564 | 10/1996 | Folino | 476/36 |
| 5,600,999 | 2/1997 | Folino | 74/122 |
| 5,607,370 | 3/1997 | Maslow et al. | 475/196 |
| 5,683,323 | 11/1997 | Imase | 475/168 |
| 5,722,910 | 3/1998 | Folino | 476/36 |

FOREIGN PATENT DOCUMENTS

| | | | |
|---|---|---|---|
| 2346611 | 10/1977 | France | 74/650 |
| 59-133863 | 8/1984 | Japan . | |
| 60-168954 | 9/1985 | Japan . | |
| 1257-331 | 2/1985 | U.S.S.R. . | |
| 1399-548 | 12/1986 | U.S.S.R. . | |
| 1490-362 | 5/1987 | U.S.S.R. . | |
| 1821597-A1 | 10/1990 | U.S.S.R. . | |
| PCT/US92/02023 | 1/1992 | WIPO | F16H 25/06 |
| PCT/US94/00841 | 8/1994 | WIPO | F16H 1/34 |
| PCT/US94/06634 | 12/1994 | WIPO | F16H 15/08 |

OTHER PUBLICATIONS

"Balls Reduce Speed and Transmit Torque", *Mechanical Engineering & Technology Guide*,; publ. prior to Mar. 14, 1991.

Dojen™ Precision Rotary Actuator Designer's Guide (Dir. of Lenze, Woburn, MA), published prior to Mar. 14, 1991.

"General Information on Sinusoidal Ball Drives", *Soviet Engineering Research*, vol. 6 (1986) Feb., No. 2 @ pp. 23–26, Mowbray, Leicestershire G.B. (also referenced as *Sov. Engineering Research*, V. Mashinostroeniya, Jun. 1986, Issue 2, pp. 24–28).

*Primary Examiner*—Khoi Q. Ta
*Attorney, Agent, or Firm*—Perkins, Smith & Cohen, LLP; Jacob N. Erlich; Jerry Cohen

[57] ABSTRACT

An in-line speed converter assembly for converting input rotation to output rotation with a minimum number of parts, the in-line speed converter having utility in a dryer as well as other devices which require in-line speed conversion with a minimum number of parts. The in-line speed converter having a conjugate pair of cam devices mounted on a common axis, an intermediate device nested between the cam devices in a common plane and having a plurality of circumferentially spaced-apart elements defining a plurality of radial slots therebetween.

20 Claims, 12 Drawing Sheets

IN-LINE SPEED CONVERTER WITH LOW PARTS COUNTS

CROSS REFERENCE TO RELATED APPLICATIONS

This application is a continuation-in-part of U.S. patent application Ser. No. 09/016,501, filed Jan. 30, 1998, Attorney Docket Number FFY-020, entitled: NESTED SPEED CONVERTER, and U.S. patent application Ser. No. 09/054,088, filed Apr. 2, 1998, Attorney Docket Number FFY-022, entitled: IN-LINE TRANSMISSION WITH COUNTER-ROTATING OUTPUTS, with both of the foregoing including their incorporated contents being incorporated herein by reference.

BACKGROUND OF THE INVENTION

The present invention relates to mechanical power transmissions, and more particularly, to an in-line speed converter having a minimum number of parts.

Speed conversion is an important capability in the efficient utilization of rotary motive force. The occasion often arises for increasing or reducing of the speed of a drive member to a higher or lower speed at a driven member. In addition, in-line speed conversion units are of utmost importance when space requirements are an essential consideration in the manufacture of devices associated therewith, such as clothes dryers and the like. In such cases, the more compact the speed conversion unit, the more space available for other operative elements of the system.

Typically, such in-line speed converters are quite complex, requiring many parts to operate in sophisticated syncopation, and are quite labor intensive for both assembly and service. Furthermore, the more compact a conventional speed reducer is, the greater generally is its cost of manufacture.

At times the effect of speed conversion (e.g., speed reducer or speed increaser) is also referred to as torque conversion (e.g., torque amplification). It will be further appreciated that the terms speed reducer and torque increaser are thus related as are the terms speed increaser and torque reducer, for purposes of this disclosure.

A prior art flat plate speed converter as disclosed in U.S. Pat. No. 5,312,306 is shown in FIG. 1; it features three axially separated disks all on a common axis. These disks include a drive cam disk D1, driven cam Disk D2, and intermediate slotted reaction disk D3. The input shaft is spindled on bearing B1. The output shaft is spindled via outboard bearing pair B2–B3, which also reacts overhung loads. Balls B in radial slots S axially couple the axially spaced drive and driven disks. Mounting to a motor requires a conventional shaft coupling. The housing is bolted together and then is mounted on the drive motor via conventional means. This is an effective drive mechanism for many purposes. However, the occasion arises where a device with higher torque capacity is needed. Furthermore, reduction of cost via reduction of number and expense of parts is further desired.

It is therefore an object of the present invention to provide a speed converter which is simplified in nature but is robust in transmission capability.

It is a further object of the present invention to provide a speed converter which is relatively easy to assemble and service.

It is still another object of this invention to provide an in-line speed reducer or speed increaser which meets various ones of the criteria of robustness, compactness, ease of service, efficiency of operation, low-cost manufacture and assembly.

It is still a further object of this invention to provide a speed converter which is capable of being incorporated within the transmission of a conventional clothes dryer or the like.

It is still another object of this invention to provide a speed converter which is economical to produce.

SUMMARY OF THE INVENTION

These and other objects are well met by the presently disclosed, in-line speed conversion assembly of the present invention. In a preferred embodiment of the invention, apparatus is provided for converting a rotary input to a rotary output. This apparatus has a cam for providing a rotary input in a first direction, and then another cam to interact therewith via rolling elements (such as rollers or balls). These elements travel in the slots of an intermediate slotted disk (the latter also referred to as a "retainer"). Thus a three disk device is disclosed, any one disk being for input and another of the disks being for output, typically with the third disk being grounded to the system housing. Alternatively, the third disk is not grounded and acts as a second input or output. The input and output rotate in either the same or opposite directions of each other.

These cams are also referred to as cam tracks, but are generally referred to below as cams. The cams have a plurality of lobes. These lobes at times may appear to be tooth-like and are referred to below either as lobes or as teeth without distinction. Preferably the cams are formed as flat plate disks or tori.

The below description can be applied to various embodiments of the invention and should be understood to do so, even though one or another embodiment is shown or described for ease of description. In other words, the following description is provided by way of illustration and not by way of limitation.

In one embodiment of the invention, both outer an cam and an inner cam nested therein are formed, wherein each cam has various defined flank portions. Rolling elements, located in radial slots of a retainer nested between these cams, are oscillated between a maximum and minimum radius by one of the cams as a drive cam, with the rolling elements contacting the presented flank portions of the adjacent cams.

In one embodiment, the retainer is a grounded reaction element for reacting the drive force on the rolling elements in the slots, and the second cam is a driven disk which is driven into rotation by action of the radially oscillating rolling elements on the flanks of the driven cam. In another embodiment, the retainer is driven into rotation by action of the radially oscillating rolling elements, with the drive force on the rolling elements being reacted by the second cam as the grounded reaction element. In yet a further alternative embodiment, the retainer is the rotary input and one of the cams is driven into rotation by action of the radially oscillating rolling elements, with the drive force on the balls being reacted by the second cam as the grounded reaction element.

In one embodiment, one cam has a driving portion and the second cam has a driven portion, wherein the driving portion has a contour that varies substantially linearly with angular rotation at a first rate of variation. The driven portion varies substantially linearly with angular rotation at a second rate of variation. Various waveforms, including those based on linear spiral segments and on sinusoidal curves, as well as others, can be used in practice of the present invention.

Preferably the cams are designed in the nature of the teachings relating to the cams developed in U.S. Pat. No. 5,312,306 and as modified in U.S. patent application Ser. No. 08/919,135, filed Aug. 30, 1997, Attorney Docket Number FFY-011FWCCIP, entitled MODIFIED-CAM SPEED CONVERTER, and U.S. patent application Ser. No. 09/016,501, filed Jan. 30, 1998, Attorney Docket Number FFY-020, entitled: NESTED SPEED CONVERTER, with the foregoing including their incorporated contents being incorporated herein by reference.

The relationship of the cams determines the speed conversion ratio of the apparatus. In accordance with the foregoing, the speed ratio of the apparatus can be determined by comparing the number of lobes of the output cam to the number of lobes of the input cam. Alternatively it can be a comparison of the number of slots to lobes, depending upon which component is input or output and which is reacting.

The cams are referred to as a conjugate pair, in that the centerline of a respective slot is defined as the straight-line locus of the interacting contact with the conjugate cams and the associated rolling element.

Features of the invention enable production of in-line, low-profile, low-cost drives for various uses. For example, an in-line, compact speed converter can be coupled with a motor assembly forming part of a clothes dryer transmission, as would enable a fan (blower) utilized therewith to fall within the "shadow" of the motor, thus providing more space for other components such as a larger drum for the clothes. The motor can be situated to rotate the main dryer drum from one extension of the motor output shaft via pulleys and belt at one rate of rotation and to drive the fan from the another extension of the motor output shaft at a second rate of rotation, with the speed converter of the invention being interposed between the motor and the load at one of these motor shaft extensions.

One benefit of the low-parts count and simplified design of the invention is its ease of assembly, as well as easy mounting to the motor. However, the disclosed nested design also can provide higher torque capacity than the axially separated cam disk prior art. Furthermore, reduction of cost via reduction of number and expense of parts is also achieved by reduction of bearing count and giving dual use to critical parts while still meeting spindling needs.

These and other features and advantages of the present invention will be more fully understood by reference to the following detailed description in conjunction with the attached drawings in which like reference numerals refer to like elements.

BRIEF DESCRIPTION OF THE DRAWINGS

FIG. 10A shows schematically a pair of conjugate cam track centerline curves of the present invention along with their loci of intersection, while

DETAILED DESCRIPTION OF A PREFERRED EMBODIMENT

Figure 1:
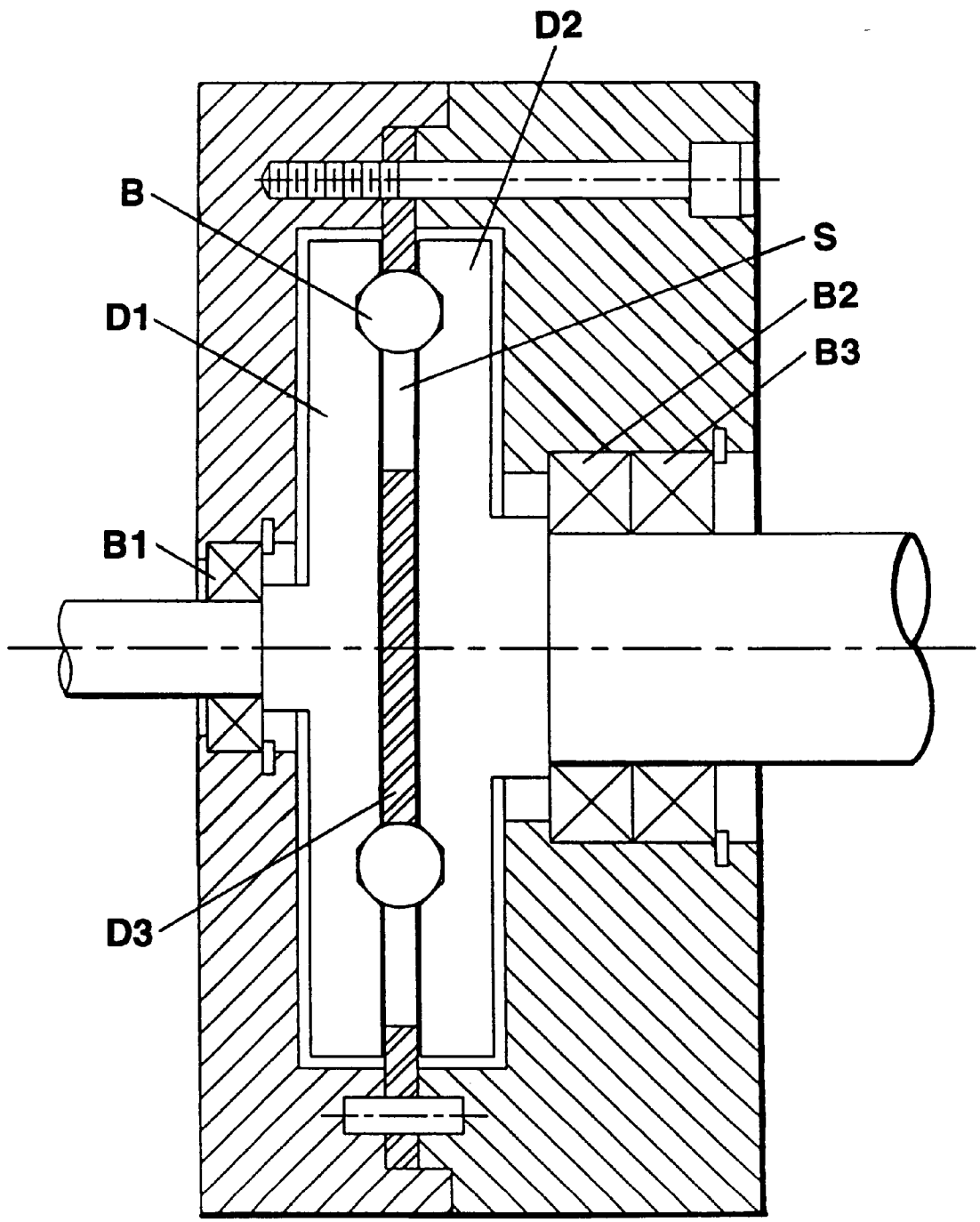
FIG. 1 is a side cross-section of a prior art flat plate speed converter.
Figure 2A:
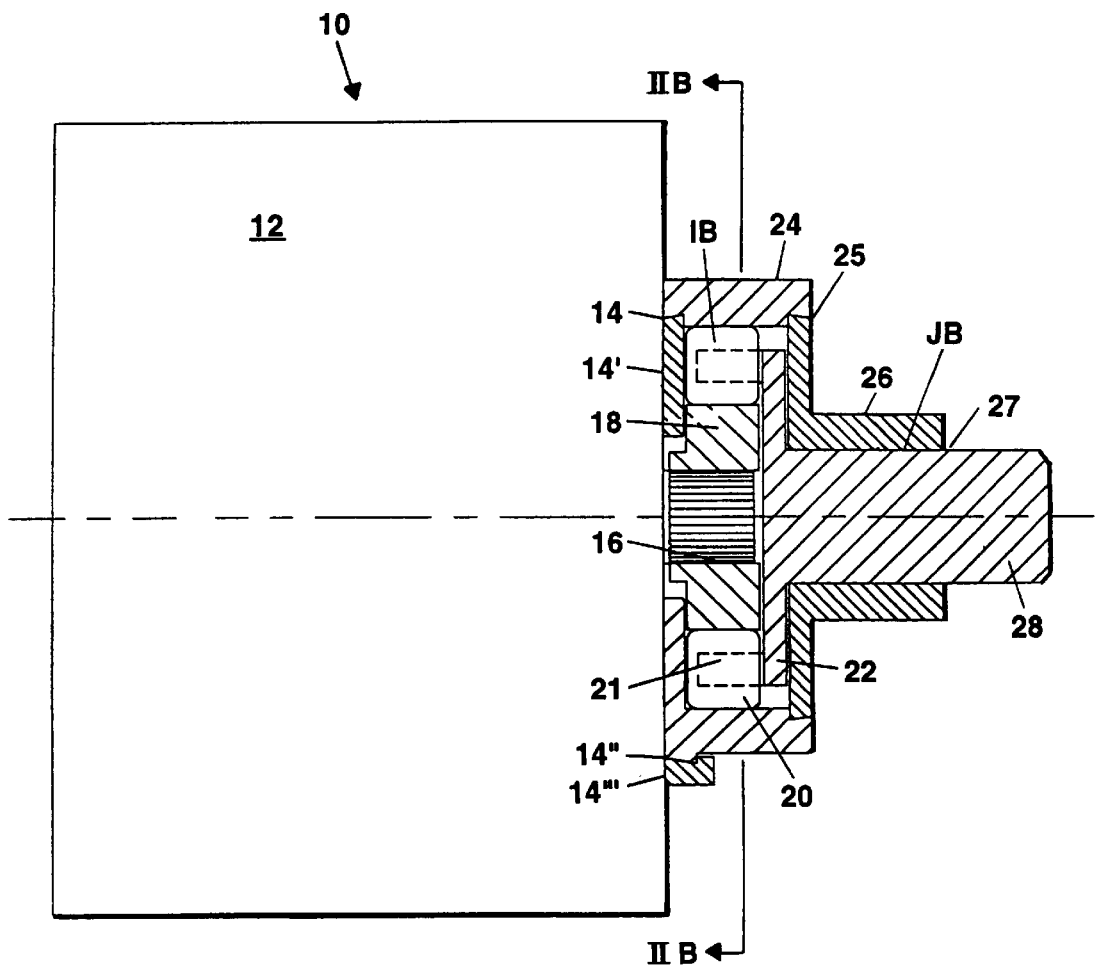
FIG. 2A is a side view, shown partially in cross-section, of a preferred speed reducer embodiment of the present invention.

A preferred single-stage nested speed converter assembly 10 of the present invention is shown in FIG. 2(A–B). Furthermore, two variations of assembly 10 are shown in FIG. 2A. The "top" variation is shown above the device centerline and the "bottom" variation is shown below the centerline.

In either case, speed converter assembly 10 of FIG. 2A is mounted to the shaft of a conventional motor 12 via a spline coupling 16 defined within the ED of drive cam 18. A complement of rolling elements 20 (shown here as rollers) is located in retainer slots 19 between retainer teeth 21 of retainer 22. Outer cam 24 coupled with cover 26 forms a housing. Outer cam 24 also is the second of the conjugate pair along with the inner drive cam 18. Cover 26 also functions as a journal bearing JB for output shaft 28 (the latter being integral with slotted retainer 22). The totality of the rollers 20 in retainer slots 19 performs an additional function, that of an input bearing IB. Thus the three bearings B1–B3 of the prior art have been totally dispensed with by using parts that otherwise already exist, in a highly cost-effective and easy-to-assemble configuration.

Referring to the top variation shown in FIG. 2A, conventional motor 12 has a disk 14' mounted on the motor face and a snap contour 14 on the ID of outer cam 24, forming a mounting mechanism. Thus the assembly 10 is assembled and snapped onto the motor as the motor shaft is mated with the spline coupling 16 in the inner drive cam disk 18. Assembly is simple. The outer cam and cover assembly 24–26 (which may be of a single piece construction) receives the retainer shaft 28, the rollers 20 are loaded, the drive cam disk 18 is installed, and the motor with the mounting ring 14' already attached is lowered onto these assembled parts until the motor shaft mates with the spline. At this time the ID of the outer cam disk 24 (which defines a snap contour 14) is snapped into place at the mating edge ring 14'. The speed converter is now securely assembled and mounted on the motor.

Referring to the lower variation shown in FIG. 2A, the outer cam 24 OD defines a snap contour 14" that mates with snap ring 14"' mounted on the motor face. Assembly is simple. Retainer 22 is placed inside of outer cam 24, the rollers 20 are loaded, inner cam 18 is inserted and then the end cap cover 26 is snapped into place. Now the motor shaft is mated with the spline coupling 16 and then the snap contour 14" engages the snap ring 14"'. The speed converter is now securely assembled and mounted on the motor.

Figure 2B:
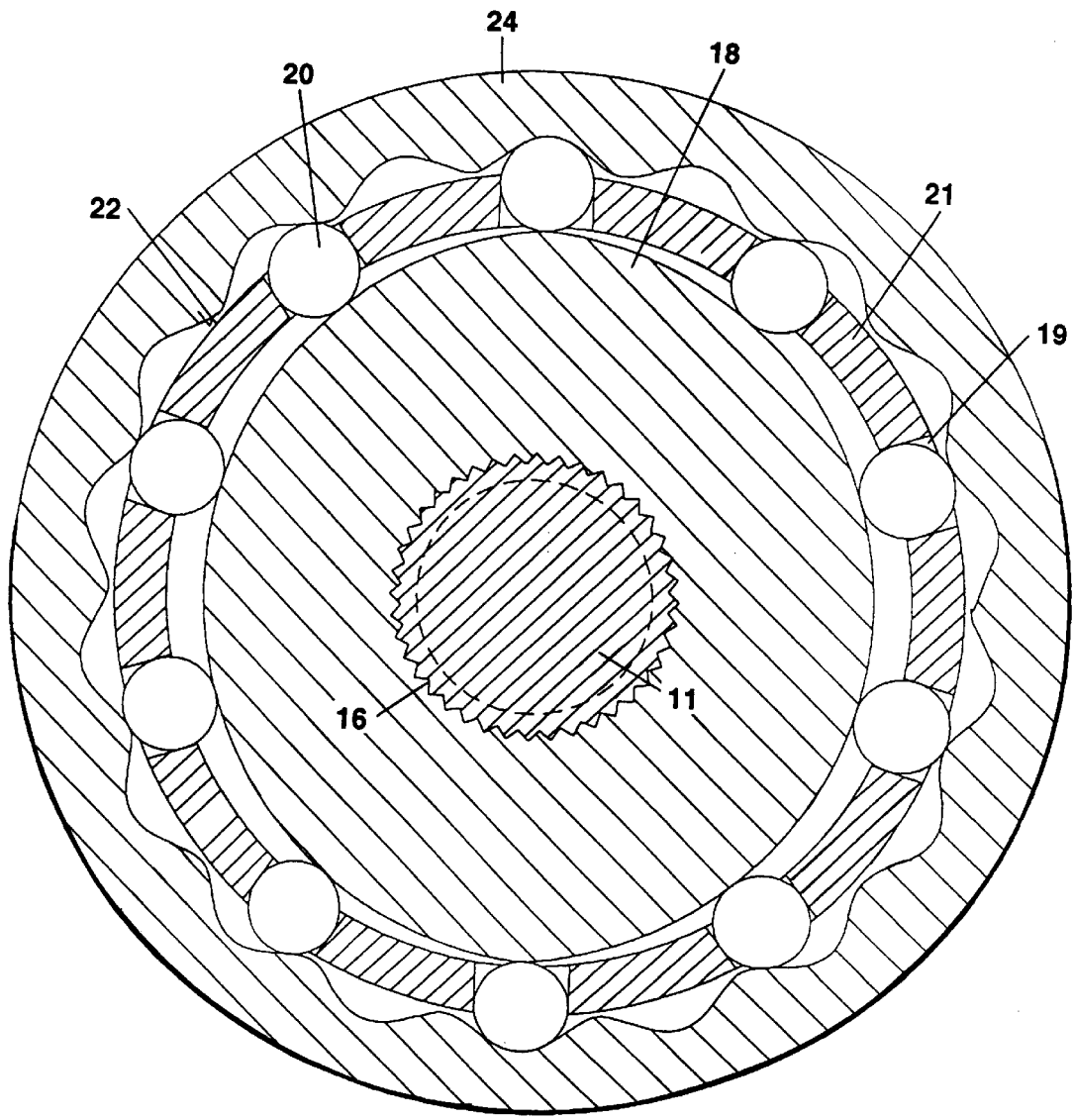
FIG. 2B is a front view of the invention of FIG. 2A, taken along line IIB—IIB of FIG. 2A.

FIG. 2B shows a face or front view of the speed converter assembly 10 of FIG. 2A in a speed reducer configuration. The drawing shows teeth 21 of retainer 22 nested between cams 18 and 24 and defining slots 19 between the retainer teeth 21. In the embodiment shown, input cam 18 has two lobes or teeth (terms used interchangeably in the rest of the disclosure) formed on its lateral face, while outer cam 24 has 18 lobes or teeth formed on its lateral face. In various embodiments, the number of lobes and slots may vary in accordance with the intended use.

Retainer 22 functions as a direction-dictating element because its number of teeth determines the position of rolling elements 20 with respect to the cam flanks on cams 18 and 24. In particular, if the number of teeth 21 in retainer 22 is chosen as the difference of the number of lobes on the two cams 18 and 24 (or as an integer factor thereof), the device functions as a direction-preserving speed converter between input cam 18 and output cam 24 when retainer 22 is grounded. In contrast, if the number of teeth 21 in retainer 22 is chosen as the sum of the number of lobes on cams 18 and 24 (or as an integer factor thereof), the device functions as a direction-reversing speed converter between input cam 18 and output cam 24 when retainer 22 is grounded. For example, but not as a statement of limitation, in the embodiment shown the number of teeth 21 in retainer 22 is ten, which is a factor of the sum of the numbers of lobes on the two cams (2+18=20). Accordingly, if retainer 22 were grounded, the speed ratio between input and output cams 18 and 24 would simply equal the ratio of the numbers of lobes on the two cams, that is, 18:2 or 9:1, with the output rotating a direction reversed from the input direction of rotation.

However, since retainer 22 is actually the output in the embodiment of FIG. 2B, while outer cam 24 is grounded, computation of the speed conversion ratio requires the following more general formula:

$$N_i \omega_i \pm N_o \omega_o = (N_i \pm N_o) \omega_r$$

In this equation, the upper sign applies to drives that are nominally direction-preserving, and the lower sign applies to drives that are nominally direction-reversing (such as the one depicted in FIG. 2B). The notations $\omega_i$, $\Omega_o$ and $\omega_r$ refer to the speeds of the inner and outer cams and the retainer, respectively, while $N_{i\,and\,No}$ are the numbers of lobes on the inner and outer cams, respectively. Referring to the configuration of FIG. 2B, if the retainer were fixed and not the output, the speed ratio between cam 18 (input) and retainer 22 (output) equals 20:2 or 10:1, and they would be rotating in the same direction (indicated by the positive sign).

The speed reducer shown in FIG. 2A–2B has been designed to be non-backdriveable by imparting the lobes on the inner cam with slopes below a threshold determined by friction. Because it is non-backdriveable, such a speed reducer can hold a load in position with power to the motor turned off, without need for an additional brake mechanism. Non-backdriveability is desirable in many speed reduction applications; however, the present invention also allows for drives to be designed with appropriate cam slopes at low to moderate speed reduction ratios so as to be backdriveable, if the application so dictates.

The speed reducer of the present invention has minimal parts count, and is capable of using very rapid and inexpensive manufacturing techniques due to its snap-together construction. It can also be readily mated to a motor shaft. Also due to the small number of parts and the possibility of using polymer materials for its manufacture, it presents a particularly lightweight and cost-effective volume-manufacturable speed converter.

Figure 3:
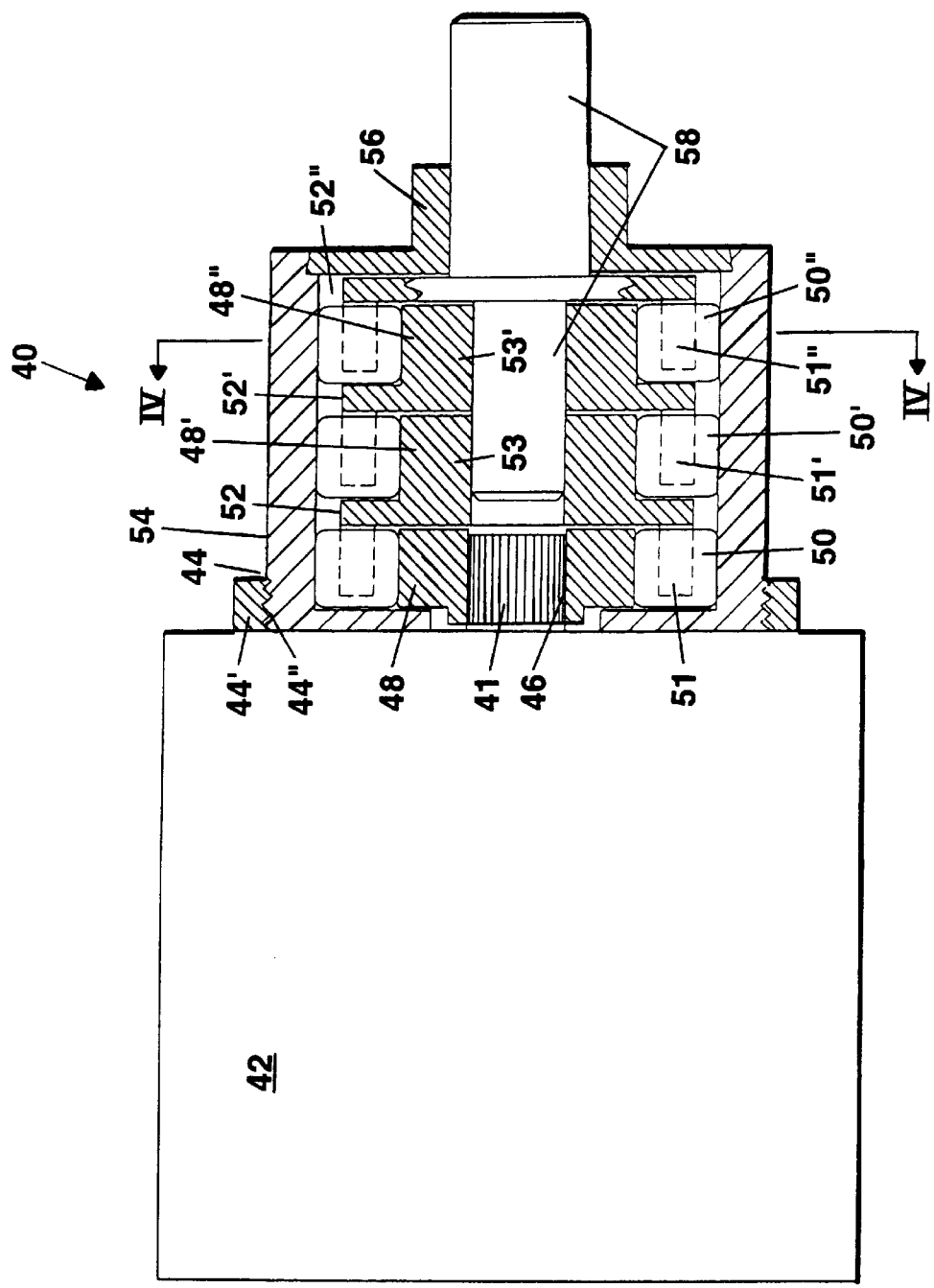
FIG. 3 is a side view, shown partially in cross-section, of a preferred multiple-stage speed reducer embodiment of the present invention.
Figure 4:
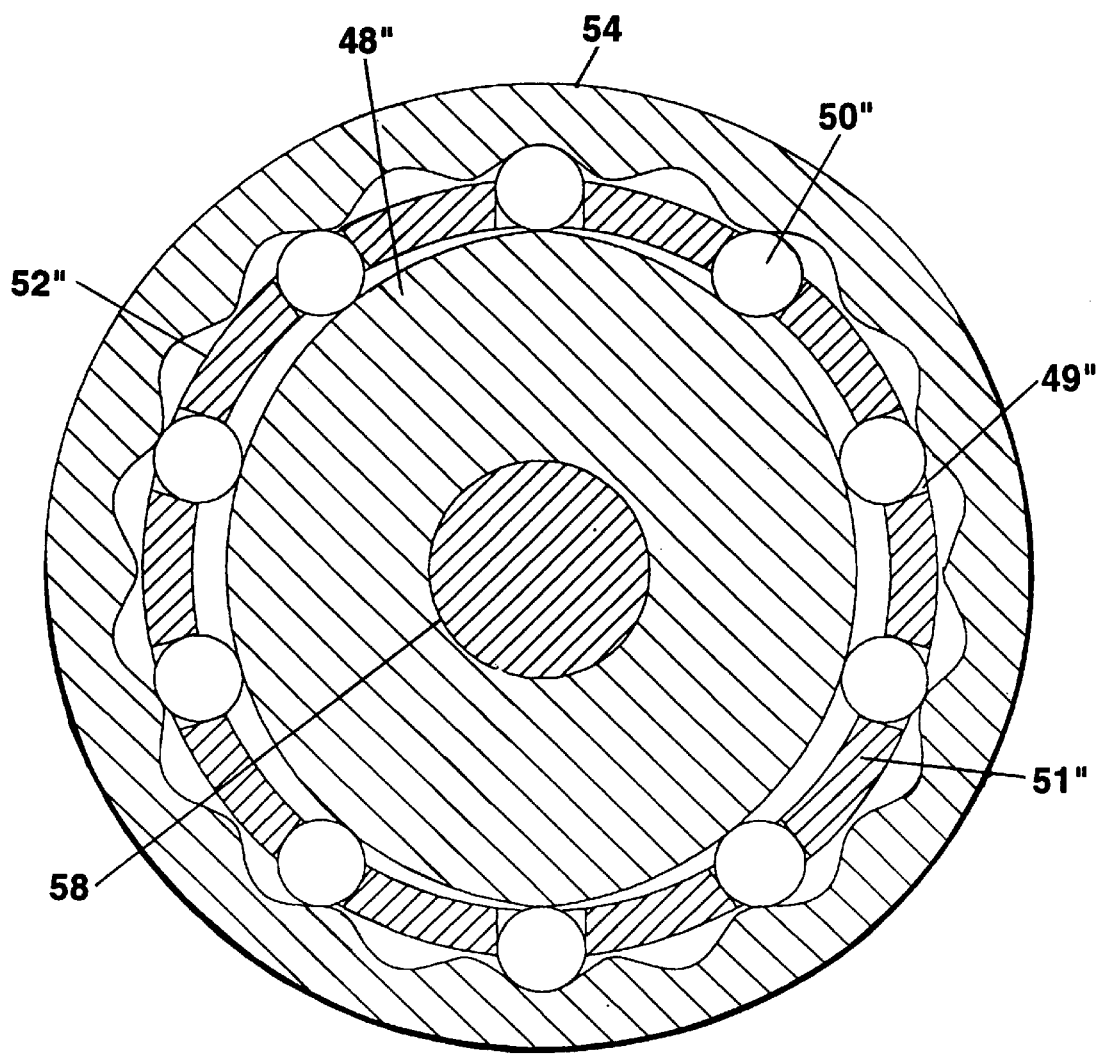
FIG. 4 is a front view of the invention of FIG. 3, taken along line IV—IV of FIG. 3.
Figure 5A:
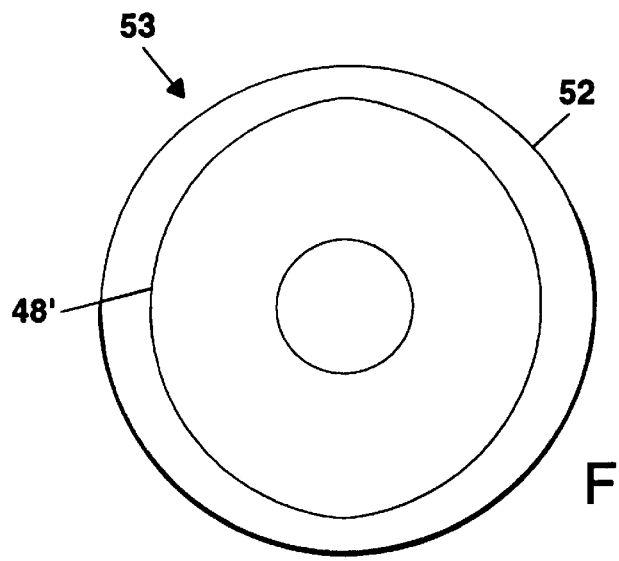
FIGS. 5(A–C) show top, side and bottom views, respectively, of an intermediate member of the invention of FIG. 3.
Figure 5B:
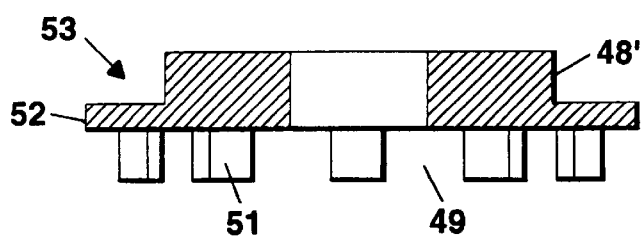
Figure 5C:
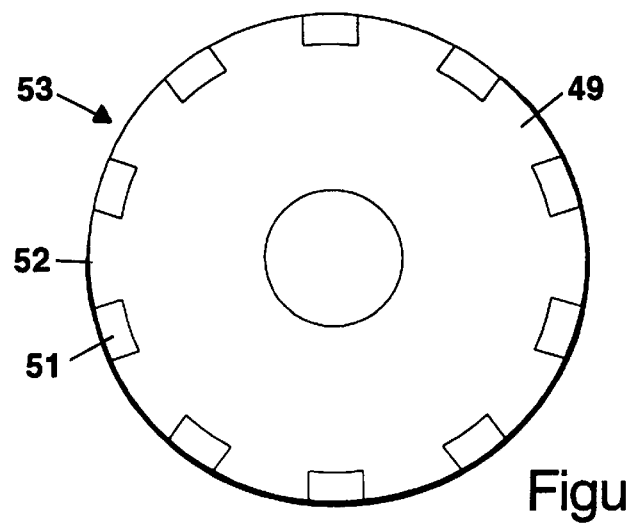

A multiple-stage speed reducer assembly 40 of the present invention is shown in FIGS. 3–4. Assembly 40 is mounted to a conventional motor 42 by way of a fastening mechanism, such as a threading 44' on the ID of ring 44 (the latter mounted on the motor face) and a cooperating threading 44" on the OD of outer cam disk 54. Assembly 40 further includes a spline coupling 46 defined at the open center of inner cam 48 for accepting of motor shaft 41. Also included are complements of rolling elements 50, 50', 50" (shown here as rollers) located in slots 49, 49' and 49" (see slot 49"' in FIG. 4) between teeth 51, 51', 51" of retainers 52, 52', 52". Retainers 52 and 52' are formed as part of intermediate members 53, 53' that also include inner cams 48', 48" formed on their opposite faces. An outer cam 54 that fastens to mechanism 44 is common to the multiple stages and doubles as a housing. Cover 56 snaps into outer cam 54 and also functions as a journal bearing for output shaft 58. In the embodiment shown, shaft 58 is integral with retainer 52" and extends into the interior of assembly 40 so as to act as a spindle for the intermediate members 53, 53'. The parts-reducing strategy of the arrangement of FIG. 2A–2B may be applied to this multi-stage configuration, as with all other embodiments of the invention FIG. 4 shows a face or front view of the speed reducer of FIG. 3 for a representative stage, where a typical slot 49" is indicated. The cam tracks and retainer teeth are designed analogously to those in the single-stage speed reducer of FIG. 2A–B. While outer cam 54 is shared by the various stages, the inner cams 48, 48' and retainers 52, 52' may be different from one stage to the next for mixing of speed ratios. The number of stages used with the present invention may vary in accordance with the desired use. A typical intermediate member 53 with a retainer 52 formed on one face and an inner cam 48' formed on the opposite face is shown in FIGS. 5(A–C).

The number of intermediate members is not limited to two, and can be as large as demanded by the speed reduction requirement. As well, in further alternative embodiments, the outer cam 54 can be designed as an extrusion, and the same basic intermediate element 53 can be repeated throughout, with the first being coupled to an input shaft at one end and the last being coupled to an output shaft at the other end of the assembly.

A major simplification of manufacture and assembly results from the use of a common outer cam 54 and a number of dual-purpose parts. Thus it will be appreciated that the present invention generalizes readily to multiple-stage embodiments for an easy-assembly, low-parts-count, inexpensive speed converter.

Figure 6:
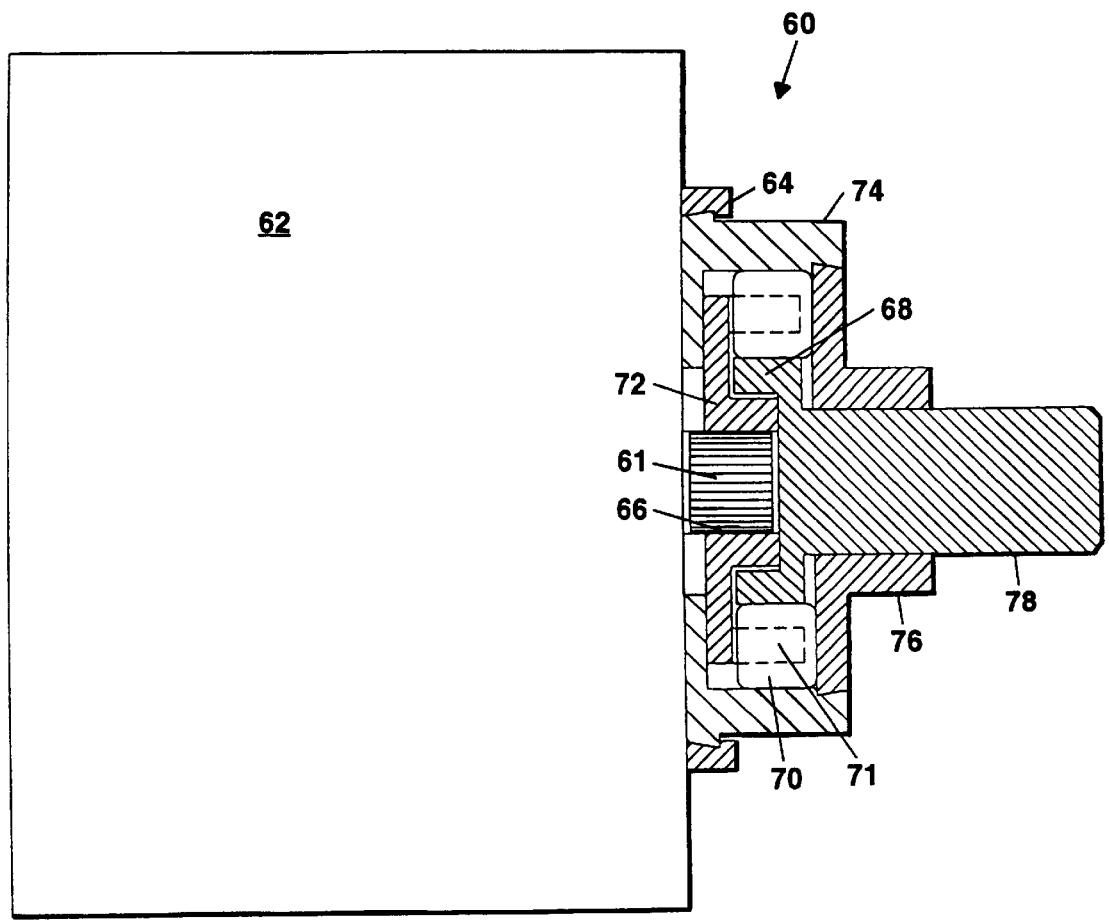
FIG. 6 is a side view, shown partially in cross-section, of a preferred speed increaser embodiment of the present invention.

FIG. 6 shows a preferred speed increaser assembly 60 of the present invention, which is mounted to a conventional motor 62 by way of fastening mechanism 64. Speed increaser assembly 60 includes a spline coupling 66 for accepting motor shaft 61 and a retainer 72 integral with the spline coupling. Also included in speed increaser assembly 60 are a complement of rolling elements 70 (shown here as rollers) located in slots (not shown, but like slots 69 of FIG. 8) between teeth 71 of retainer 72, as well as an inner cam 68 formed integrally with output shaft 78. An outer cam 74 that snaps into mechanism 64 doubles as a housing. Cover 76 snaps into outer cam 74 and also functions as a journal bearing for output shaft 78.

Figure 7:
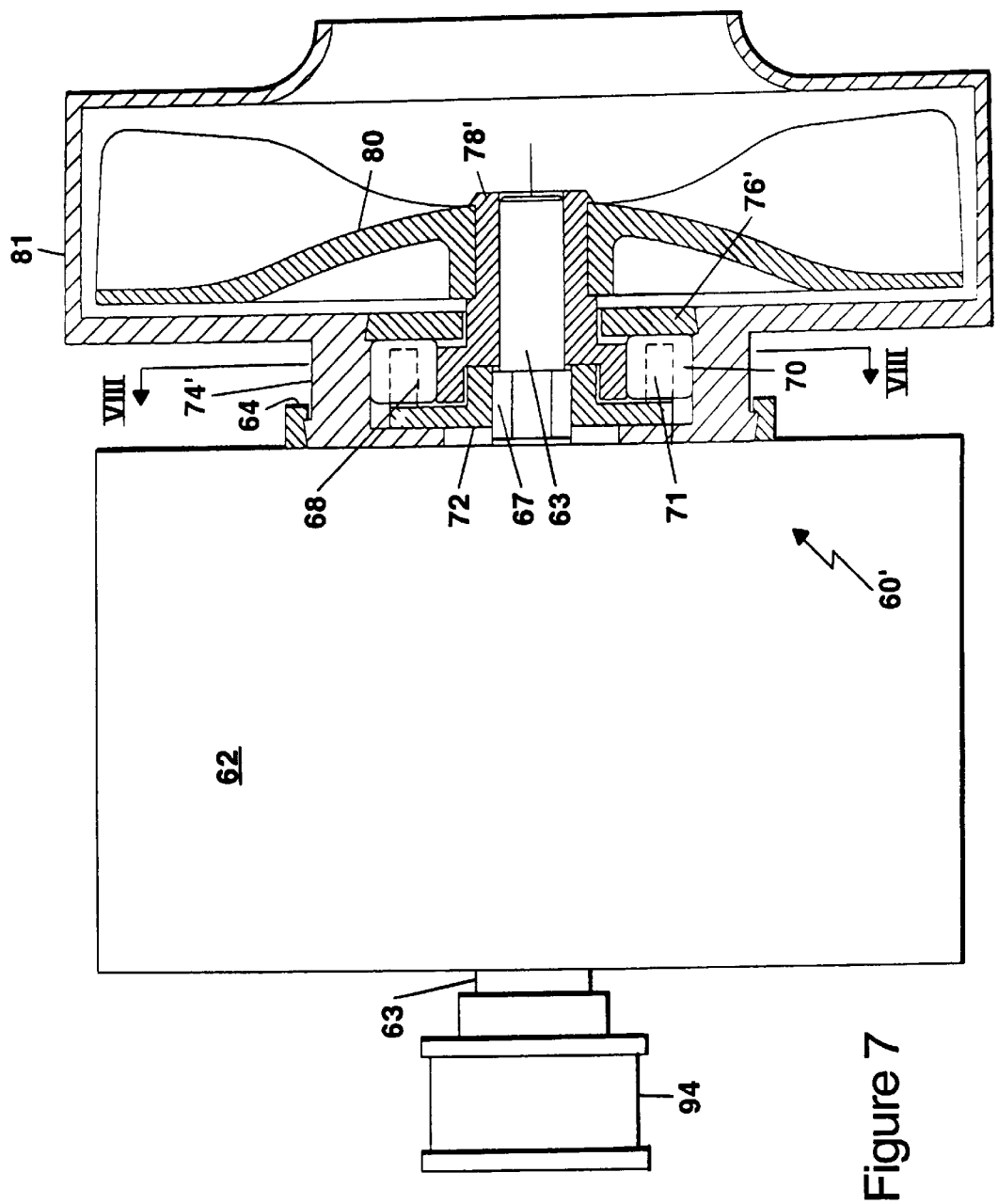
FIG. 7 is a side view, shown partially in cross-section, of a preferred speed increaser embodiment with attached blower of the present invention.

FIG. 7 shows an alternative embodiment 60' of the speed increaser assembly 60 of FIG. 6. Assembly 60' includes a blower 80 (such as in the shape of a fan) attached to a hollow output shaft 78'. Hex coupling 67 is provided for motor shaft 63. Motor shaft 63 extends through the assembly and acts as a spindle within the output shaft 78' spindled thereon and acting as a journal bearing. Outer cam 74' blends into cowling 81 for blower 80. The orientation of retainer 72 is reversed from those of retainers 22, 52, . . . in the speed-reducing embodiments of FIGS. 2–4 to allow it to function as the rotary input part of the speed increaser assembly 60', with the inner cam disk 68 providing the rotary output and the outer cam disk 74' being grounded as part of the housing.

Figure 8:
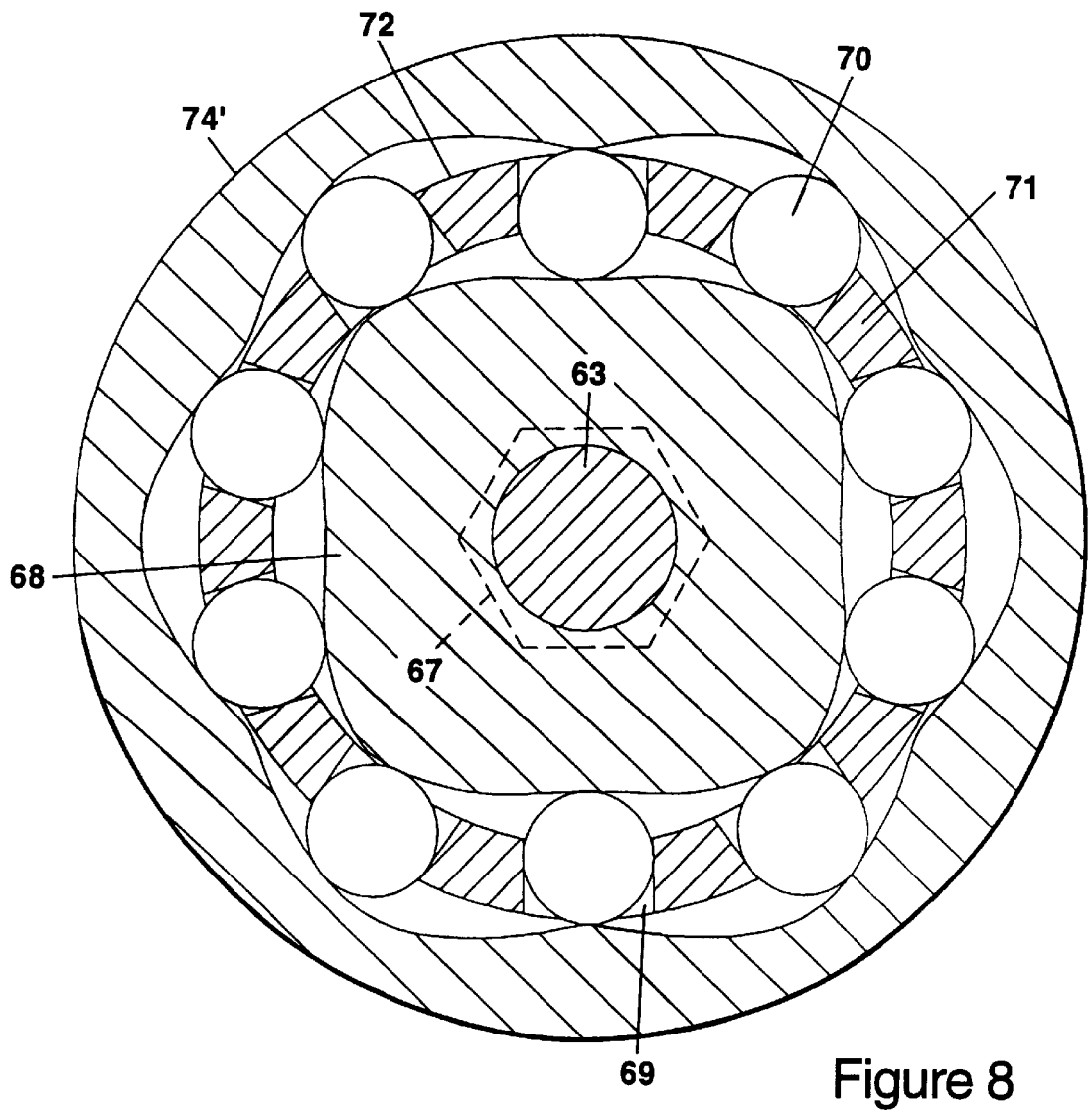
FIG. 8 is a front view of the invention of FIG. 7, taken along line VIII—VIII of FIG. 7.

FIG. 8 shows a face or front view of the speed increaser assembly 60' of FIG. 7 (with a typical slot 69 indicated; blower 80 is not shown). The cam tracks and retainer teeth are designed analogously to those in the single-stage speed reducer of FIG. 2A–B, with the difference being that the drive is deliberately designed at low to moderate ratio and appropriate cam lobe slopes so as to be backdriveable, and hence to function as a speed increaser. As with the speed reducer assemblies of FIGS. 2A–B and 3, the speed increaser assemblies of FIGS. 6 and 7 of the present invention also offer the benefits of ease of assembly, low parts count, inexpensive manufacture and light weight.

Figure 9:
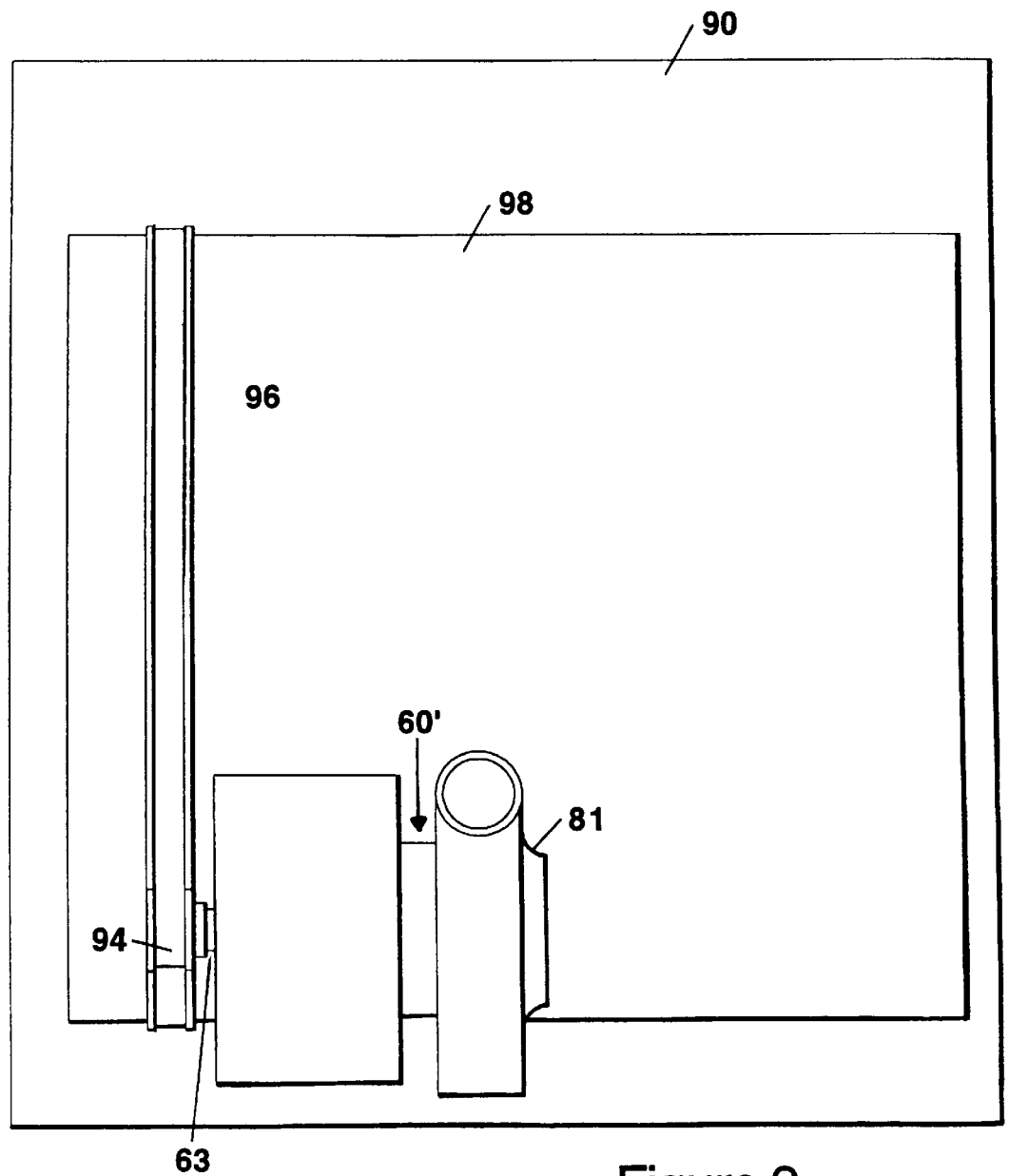
FIG. 9 shows schematically the inclusion of the present invention of FIG. 7 in a clothes dryer.

The speed increaser assembly 60' of FIG. 7 is shown in FIG. 9 as part of the transmission of a clothes dryer 90, in which the conventional motor 62 has outputs taken from the output shaft exposed on both ends of the motor. At one end, the unshown motor shaft drives blower 80 (hidden from view by cowling 81) at increased speed through the speed increaser 60', whereas the extension of shaft 63 as shown through the other end of motor 62 drives a drum 98 through pulley 94 and belt 96. This embodiment offers the benefits of double duty for a single motor, as well as speed-optimized utilization of motor power for disparate actions (i.e., rotating a drum at one speed and rotating at a higher speed an air blowing fan), all in a volumetrically efficient and low-cost package.

In typical speed converter assemblies of the present invention (e.g., assembly 10 shown in FIG. 2(A–B), inner cam 18 is connected to an input and moves rolling elements 20 radially in and out within slots 19 of retainer 22, and the latter is driven into rotation by the reaction of rolling elements 20 against the lobes of stationary outer cam 24. An output is taken from rotating retainer 22. In further alternative embodiments, retainer 22 may be grounded instead, and the output taken from outer cam 24.

In typical speed increaser assemblies of the present invention (e.g., assembly 60 shown in FIG. 6), retainer 72 is connected to an input and moves rolling elements 70 around the circumference of inner cam 68, which is driven into rotation by the reaction of rolling elements 70 against the lobes of stationary outer cam 74. Rolling elements 70 also move radially in and out within slots 69 of rotating retainer 72 in this process. A speed-increased output is taken from inner cam 68. In further alternative embodiments, retainer 72 may be grounded instead, and the input applied to a rotating outer cam 74.

A preferred procedure for designing the cam tracks utilized with the speed converters of this invention is also disclosed. The basic cams can be designed as described earlier, as well as by other means, featuring various curves such as spirals (not necessarily linear), modified spirals, sinusoids, and other smooth curves. The notion of conjugacy is common to all such designs and in its most generalized sense implies that a constant-speed input produces a constant-speed output.

In particular, conjugacy is achieved in cam-type devices such as those of the present invention by using the same basic functional relationship between polar angle and polar radius in generating the inner and outer cam tracks. Such a function (whether linear or other spiral, sinusoid, or other) describes the shape of a lobe or tooth and serves as the basic building block in generating the cams. An actual cam (inner or outer) with N teeth (or lobes) is generated by repeating the tooth shape N times around a circle of chosen diameter. Cams generated with the same tooth shape can differ in their numbers of lobes or teeth but will be conjugate, meaning that they can serve as input or output in an operable speed converter.

Figure 10B:
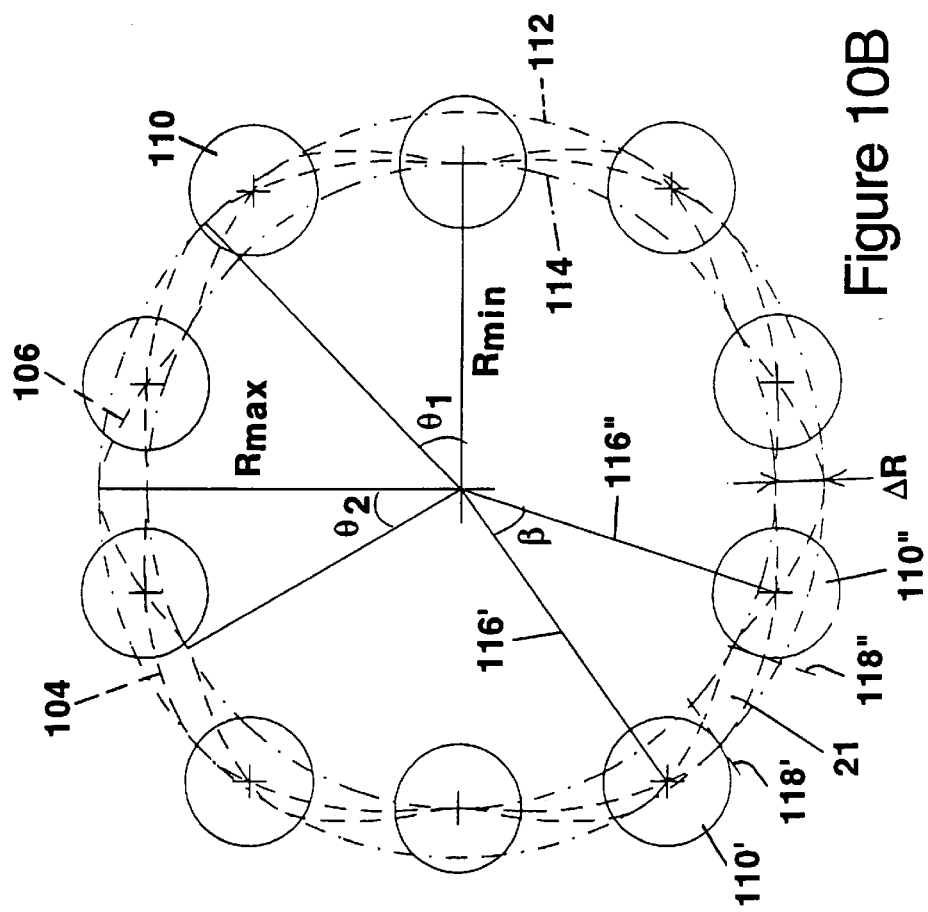
FIG. 10B shows the same two conjugate curves along with a complement of rolling elements.
Figure 10A:
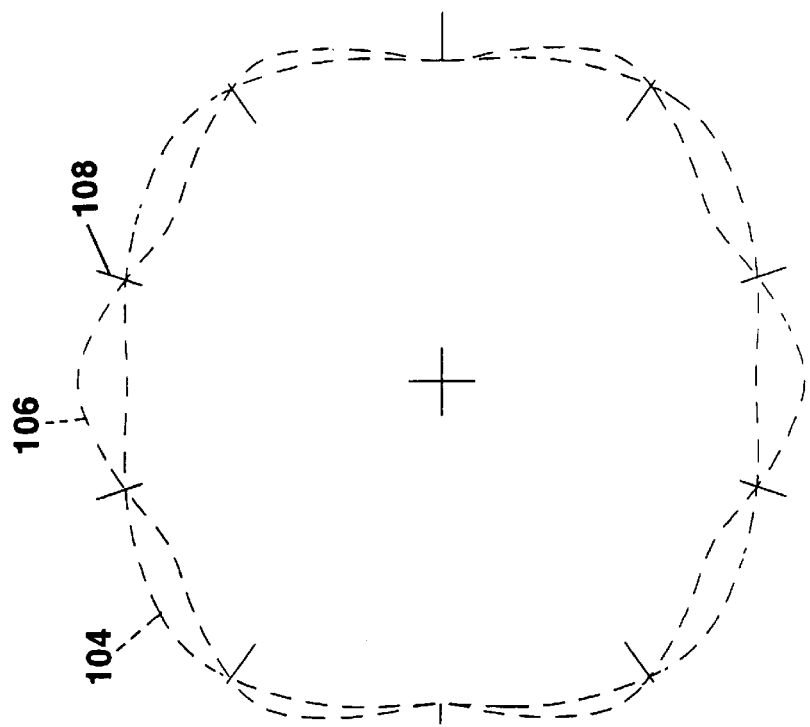

FIG. 10A shows two conjugate cam tracks 104, 106 having 4 and 6 teeth, respectively. These cam tracks can operate as parts of a speed converter in which the speed ratio is 6:4 or 3:2, reversed; e.g., if the cam with 4 teeth is rotated clockwise at a speed of 1800 rpm, the conjugate cam with 6 teeth can rotate counterclockwise at a speed of 1200 rpm. The points where the two cam tracks intersect then trace out loci 108 in the plane which are of the form of straight radial lines; this form of the loci implies and is implied by (in other words, is equivalent to) the conjugacy of the two cam tracks.

FIG. 10B shows the same two cam tracks 104, 106 with additional details provided. Instead of showing the loci 108 over time of the intersections of the two tracks as in FIG. 10A, attention is focused instead on the particular instant depicted, and a rolling element 110 is placed at each intersection of cam tracks 104 and 106. There are 4+6=10 such elements 110, meaning that the drive is direction-reversing between cam tracks 104 and 106. It is seen that each cam track 104, 106 varies between the same radial extremes $R_{max}$, $R_{min}$ indicated by circles 112, 114 respectively. A half tooth covers 360°/(2*4)=45° on cam track 104 with 4 teeth, and 360°/(2*6)=30° on cam track 106 with 6 teeth; in generic terms, the half-tooth angle of an inner cam is $\theta_1$ and that of an outer cam is $\theta_2$. The angle between any two consecutive rolling elements 110', 110" in the particular embodiment shown is 360°/10=36°; in generic terms, this angle is $\beta$.

The various angles are shown in FIG. 10B in generic terms. In what follows, inner cam 18 will be considered representative of inner cams 18, 48, 48', 48" and 68; outer cam 24 will be considered representative of outer cams 24, 54, 74 and 74'; rolling elements 110 will be considered representative of rolling elements 20, 50, 50', 50" and 70; retainer 22 will be considered representative of retainers 22, 52, 52', 52" and 72; retainer teeth 21 will be considered representative of retainer teeth 21, 51, 51', 51" and 71 and retainer slot 19 will be considered representative of retainer slots 19, 49, 49', 49" and 69. The difference $R_{max}-R_{min}$ shown in FIG. 10B is the stroke $\Delta R$; this is the length of the straight-line loci 108 of FIG. 10A.

Inasmuch as their centers trace straight-line radial loci 108, it will now be appreciated that the rolling elements 110 can be housed in slots 19 between teeth 21 of a typical retainer 22 and act as the transmission elements between two cams 18, 24 in a speed converter of the present invention. Circles 112, 114 delineate the nominal radial extent of the retainer teeth 21, so as to ensure continuous contact with rolling elements 110 throughout their travel. The tangential extent of a retainer tooth is found by drawing radii 116', 116" from the center of circles 112, 114 to the centers of any two consecutive rolling elements 110', 110", and then parallel-shifting radii 116, 116" to generate lines 118' and 118". Lines 118' and 118" along with circles 112, 114 enclose a typical retainer tooth 21.

It is seen that the first step in generating an optimized design is to choose the number of rolling elements, their radius, and one of $R_{max}$, $R_{min}$ and $\Delta R$ so as to ensure a chosen minimum width for a retainer tooth Best utilization of available space dictates that the retainer teeth be as wide as they need to be in order to carry the specified load, and no wider. It is also to be noted that the cam tracks 104, 106 depicted in FIGS. 10(A–B) represent hypothetical centerlines and not the actual cam flanks. They need to be parallel-shifted by a distance equal to a rolling element radius so that the rolling element can actually be in contact with the cam flank.

Figure 11:
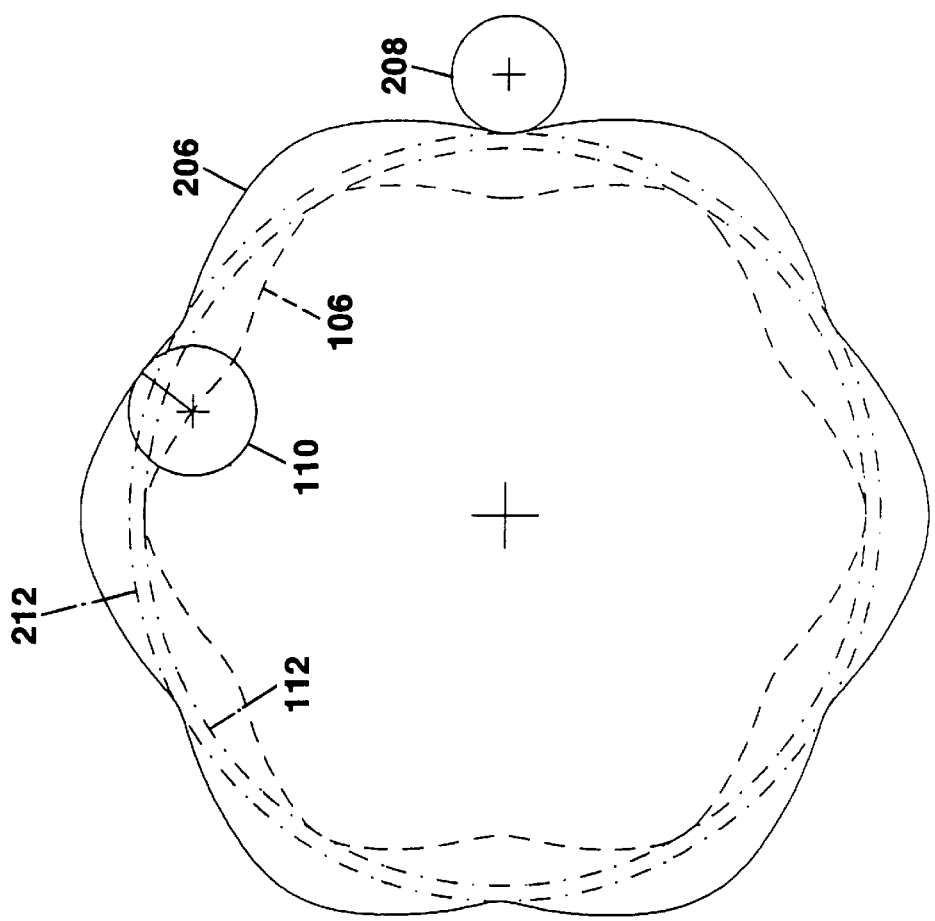
FIG. 11 shows schematically the generation of an outer cam track flank curve of the present invention.

In particular, FIG. 11 shows the generation of an outer cam flank 206 based on a cam track 106 as a centerline. A typical rolling element 110 is depicted to indicate that its center follows the hypothetical centerline 106 when 110 rolls inside the actual flank 206. In addition to circle 112 showing the maximum nominal radial extent of the retainer, a second circle 212 is shown that corresponds to the minimum radial extent of cam flank 206. This brings forth a second step in optimization, which is to ensure an adequate clearance between the retainer and the cam so the former can be nested inside the latter while accommodating manufacturing tolerances and the curvature of the retainer teeth. In mathematical terms, one needs $\Delta R$ to be less than the rolling element radius by some chosen (small) multiple of rolling element radius; this ensures a positive clearance such as the one shown in FIG. 11. A third step in optimization is to avoid sharp re-entrant corners or cusps in the outer cam flank 206. This may be accomplished by requiring a minimum radius of curvature at the inner tooth tips, as indicated by tangent circle 208 in FIG. 11. The minimum radius of curvature depends on the maximum allowable contact stress between rolling element and cam flank under load, and is typically also expressed as a multiple of the rolling element radius.

Figure 12:
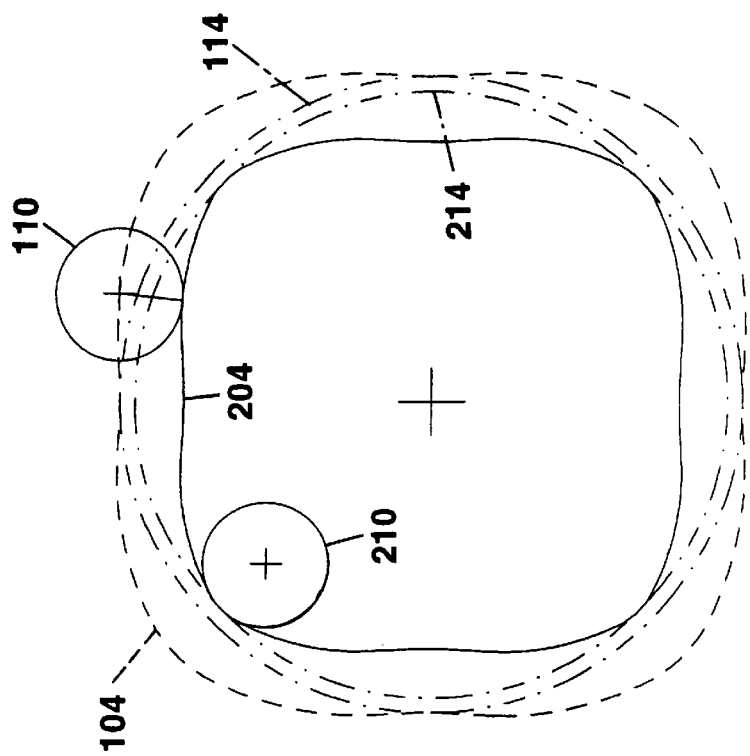
FIG. 12 shows schematically the generation of an inner cam track flank curve of the present invention.

In FIG. 12, the generation of an actual inner cam flank 204 based on cam track 104 as a hypothetical centerline is shown. The construction is analogous to that in FIG. 11, except that now the parallel shift is inward rather than outward. Circle 114 shows the minimum radial extent of the retainer, while circle 214 shows the maximum radial extent of inner cam flank 204. The clearance between the two is identical to that between circles 112 and 212 in FIG. 11 and thus does not pose a further constraint on the design. However, the requirement of avoiding sharp corners on the cam flank and the need for limiting contact stresses under load indicate that a minimum radius of curvature must be maintained at the outer tooth tips. This is indicated by tangent circle 210 in FIG. 12 and forms the fourth step in optimizing the design.

In all, this optimization process of the present invention is driven by four constraints as described above (minimum allowable retainer tooth width, positive clearance between cams and retainer, and minimum allowable radii of curvature at inner and outer tooth tips), resulting in cams that are volumetrically most compact and have the best contact angles as is possible within all the requirements placed on the design. This process of optimization maintains contact stresses and part deformations under chosen limits. This process also serves to maximize operating efficiency of the drive and makes it likely to be backdriveable at low to moderate ratios. If non-backdriveability is desired at these ratios, the stroke $\Delta R$ may be further reduced so as to make the cam lobe slopes smaller than the friction threshold.

Various other modifications of the specific embodiments set forth above are also within the spirit and scope of the invention. The above examples and embodiments are provided by way of illustration and not by way of limitation of the scope of the present invention. Optimization is a desired goal of the invention, and is not meant to imply that poor practice of the invention is not intended to be covered by the claims of this disclosure. It will be further appreciated that apparatus made in accordance with the teachings of the present invention has a multiplicity of speed and torque conversion applications, including various industrial applications. The scope of the present invention is as set forth in the following claims.

What is claimed is:

1. An in-line speed converter assembly for converting input rotation to output rotation with a minimum number of parts, said converter assembly comprising:

a conjugate pair of cam devices mounted on a common axis, an intermediate device nested between said cam devices in a common plane and having a plurality of circumferentially spaced-apart elements defining a plurality of radial slots therebetween, wherein each said slot is disposed to receive an interacting element for engagement between said conjugate pair of cam devices, one of said devices forming a rotatable output device, another of said devices forming a rotatable input device for delivery of drive forces to said output device, and a third of said devices assisting delivery of said drive forces by said input device to said output device, at least two of said devices having portions thereof for engaging said interacting elements for movement therebetween, a plurality of interacting elements, each of said interacting elements having a defined radius and being radially movable within a slot for engagement between said conjugate pair of cam devices, said cam devices defining teeth extending radially out to their tins; and ones of said cam devices defining radii of curvature at inner or outer tooth tips, said radii generally expressed as a multiple of said interacting element radius.

2. The in-line speed converter assembly as defined in claim 1 wherein said interacting elements and said slotted device cooperate with said conjugate pair to act as an input bearing.

3. The in-line speed converter assembly as defined in claim 1 further comprising a rotary shaft, one of said devices forming a journal bearing for receipt of said rotary shaft.

4. The in-line speed converter assembly as defined in claim 1 further comprising a rotary shaft, one of said devices forming a journal bearing device for receipt of said rotary shaft, said journal bearing device being rotatable.

5. The in-line speed converter assembly as defined in claim 2 wherein said intermediate device is said output device and wherein said interacting elements are rolling elements.

6. The in-line speed converter assembly as defined in claim 1 further comprising a plurality of intermediate devices, each of said intermediate devices having a distinct plurality of interacting elements operably associated therewith.

7. The in-line speed converter assembly as defined in claim 1 wherein said in-line speed converter acts as a speed reducer or speed increaser.

8. An in-line speed converting assembly for use with a motor, said motor having a drive shaft protruding from at least one side thereof, said drive shaft defining a longitudinal axis, the assembly comprising:

a conjugate pair of cam devices mounted along said longitudinal axis;

an intermediate device nested between said cam devices in a common plane and having a plurality of circumferentially spaced-apart elements defining a plurality of radial slots therebetween;

one of said devices having the function of a rotatable output device, said output device lying along said longitudinal axis, another of said devices having the function of a rotatable input device for delivery of drive forces from said drive shaft to said output device, said input device securing said input device to said drive shaft, and a third of said devices having the function of assisting delivery of said drive forces by said input device to said output device;

a plurality of interacting elements, each of said plurality of interacting elements having a defined radius and being radially movable within a slot for engagement between said conjugate pair of cam devices said cam devices each defining teeth extending radially to define tooth tips;

at least two of said devices having portions thereof for capturing said interacting elements for movement therebetween; and one of said devices securing the device to a rigid portion associated with said motor, at least one of said devices having the additional function of housing ones of said devices, said devices cooperating to perform the function of a speed converter, and ones of said cam devices defining radii of curvature at inner or outer tooth tips, said radii generally expressed as a multiple of said interacting element radius.

9. The in-line speed converting assembly as defined in claim 8 wherein said drive shaft protrudes from two sides thereof and said output device is rotatable at a speed different than said drive shaft.

10. The in-line speed converting assembly as defined in claim 8 wherein ones of said devices are rotatable.

11. The in-line speed converting assembly as defined in claim 8 wherein one of said devices forms a journal bearing.

12. The in-line speed converting assembly as defined in claim 10 wherein said interacting elements and said intermediate device form an input bearing.

13. The in-line speed converting assembly as defined in claim 8 further comprising a blower device attached to one end of said output device, and a main driver drum coupled to one end of the motor output shaft, said blower rotating at one rate of rotation and said drum rotating at another rate of rotation, wherein said speed converter of the invention is interposed between said motor and said blower.

14. The apparatus of claim 8, further defining:
a housing for a rotary dryer;
a rotatable drum located within said housing;
an assembly located within said housing;
said assembly comprising said motor, said motor having said drive shaft defining a longitudinal axis;
said conjugate pair of cam devices mounted along said longitudinal axis on one side of said motor;
an intermediate device nested between said cam devices and having a plurality of circumferentially spaced-apart elements defining a plurality of radial slots therebetween for receipt of a plurality of interacting elements, each of said plurality of interacting elements in said slots being radially movable for engagement between said conjugate pair of cam devices;
one of said devices forming a rotatable output device, said output device lying along said longitudinal axis, another of said devices forming a rotatable input device for delivery of drive forces from said drive shaft to said output device, said input device disposed to be secured to said motor drive shaft at one said motor end, and a third of said devices assisting delivery of said drive forces by said input device to said output device;
at least two of said devices having portions thereof for capturing said interacting elements for movement therebetween;
one of said devices having means thereon for securing the device to a rigid portion associated with said motor; and
a blower in said housing, said blower connected to said output device; and
means for interconnecting said drum to said drive shaft;
wherein said drum and said blower are rotatable at different speeds.

15. The assembly of claim 8 wherein said cams define cam flanks that are parallel-shifted by a distance equal to said rolling element radius whereby said rolling element is in contact with said cam flank.

16. An in-line speed converting assembly for use with a motor, said motor having a drive shaft protruding from at least one side thereof, said drive shaft defining a longitudinal axis, the assembly comprising:
a conjugate pair of cam devices mounted along said longitudinal axis;
an intermediate device nested between said cam devices in a common plane and having a plurality of circumferentially spaced-apart elements defining a plurality of radial slots therebetween;
one of said devices forming a rotatable output device, said output device lying along said longitudinal axis, another of said devices forming a rotatable input device for delivery of drive forces from said drive shaft to said output device, said input device having means thereon for securing said input device to said drive shaft, and a third of said devices assisting delivery of said drive forces by said input device to said output device;
a plurality of interacting elements, each of said plurality of interacting elements being radially movable within a slot for engagement between said conjugate pair of cam devices;
at least two of said devices having portions thereof for capturing said interacting elements for movement therebetween; and
one of said devices having means thereon for securing the device to a rigid housing portion of said assembly associated with said motor,
wherein said drive shaft protrudes from two sides of said motor and said output device is rotatable at a speed different than said drive shaft.

17. The assembly of claim 16 wherein said cams define cam flanks that are parallel-shifted by a distance equal to said rolling element radius whereby said rolling element is in contact with said cam flank.

18. An in-line speed converter assembly for converting input rotation to output rotation with a minimum number of parts, said converter assembly comprising:
a conjugate pair of cam devices mounted on a common axis,
an intermediate device nested between said cam devices in a common plane and having a plurality of circumferentially spaced-apart elements defining a plurality of radial slots therebetween, wherein each said slot is disposed to receive an interacting element of a defined radius for engagement between said conjugate pair of cam devices, one of said devices forming a rotatable output device, another of said devices forming a rotatable input device for delivery of drive forces to said output device, and a third of said devices assisting delivery of said drive forces by said input device to said output device, at least two of said devices having portions thereof for engaging ones of said interacting elements for movement therebetween, said devices cooperating to perform the function of a speed converter, wherein said cams define cam flanks that are parallel-shifted by a distance equal to said defined radius whereby said interacting elements are in contact with said cam flanks.

19. An in-line speed converting assembly for use with a motor, said motor having a drive shaft protruding from at least one side thereof, said drive shaft defining a longitudinal axis, the assembly comprising:

a conjugate pair of cam devices mounted along said longitudinal axis;

an intermediate device nested between said cam devices in a common plane and having a plurality of circumferentially spaced-apart elements defining a plurality of radial slots therebetween;

one of said devices forming a rotatable output device, said output device lying along said longitudinal axis, another of said devices forming a rotatable input device for delivery of drive forces from said drive shaft to said output device, said input device having means thereon for securing said input device to said drive shaft, and a third of said devices assisting delivery of said drive forces by said input device to said output device;

a plurality of interacting elements, each of said plurality of interacting elements being radially movable within a slot for engagement between said conjugate pair of cam devices;

at least two of said devices having portions thereof for capturing said interacting elements for movement therebetween; and one of said devices having a securing arrangement to secure it to a rigid portion associated with said motor, said devices cooperating to function as a speed converter, wherein said drive shaft protrudes from two sides of said motor and said output device is rotatable at a speed different than said drive shaft.

20. The assembly of claim 19 wherein a blower device is attached to one end of said output device, and a main dryer drum is coupled to one end of the motor output shaft, said blower rotating at one rate of rotation and said drum rotating at another rate of rotation, wherein said speed converter of the invention is interposed between said motor and said blower.

* * * * *